June 2, 1970  E. RASCH ET AL  3,516,010
LASER HAVING A COATED DISCHARGE TUBE TO REDUCE
THE EFFECTS OF CLEAN-UP
Filed Aug. 26, 1965
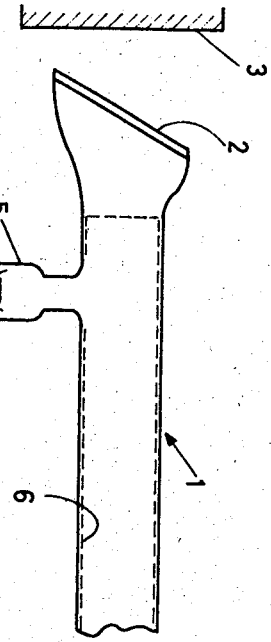
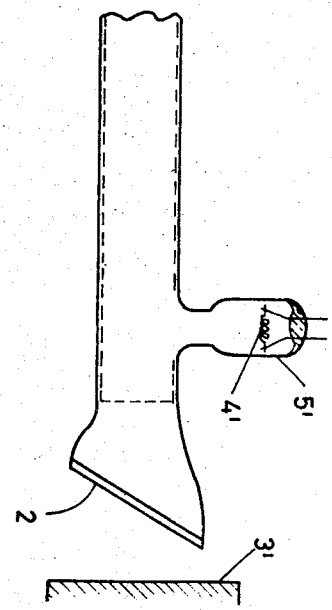
Erhard Rasch
Dr. Herbert Dziergwa
INVENTORS
BY
Howard P. King
ATTORNEY

United States Patent Office 3,516,010
Patented June 2, 1970

---

3,516,010
LASER HAVING A COATED DISCHARGE TUBE TO REDUCE THE EFFECTS OF CLEAN-UP
Erhard Rasch and Herbert Dziergwa, Berlin, Germany, assignors to Patent-Treuhand-Gesellschaft Furelektrische Gluhlampen m.b.H., Munich, Germany
Filed Aug. 26, 1965, Ser. No. 482,842
Claims priority, application Germany, Sept. 1, 1964, P 34,985
Int. Cl. H01s 3/02
U.S. Cl. 331—94.5     3 Claims

ABSTRACT OF THE DISCLOSURE

An optical laser comprising an elongated tube constituted as a resonator by reflectors at opposite ends and with an active gas therein and having means for maintaining electronic discharge therein, said tube having non-reflecting protective coating on the interior surface thereof comprising of a crystalline substance selected from the group of metal oxides and their compounds with oxygen of which examples are magnesium oxide, tin oxide, zirconium oxide, aluminum oxide, beryllium oxide, and from metal salts of phosphoric acid and silicic acid, namely phosphates and silicates and the like from those metals.

---

Generally, the discharge envelope consists of a cylindrical tube the ends of which are sealed with two opposite reflectors one of which is somewhat transmissive to radiation. Those reflectors seal off the discharge tube vacuum-tight against the outer atmosphere. The reflectors may, however, also be arranged outside of the discharge envelope if this latter is closed by two plane parallel plates which are set at a certain angle, known as the Brewster angle, to the direction of light emission. This angular adjustment of the plates minimizes reflection losses on them of the radiation which is polarized in the plane of incidence. This so-called Brewster angle, in case of quartz, amounts to about 55° to the axial direction of the tube. Since it is quite difficult to seal parallel ground soft-glass plates onto the tube, the end plates must consist of quartz glass and, therefore both the tube and plates are quartz glass. The additional advantage is obtained thereby that the thermal expansion of the arrangement remains very low.

The length of the discharge tube determines, amongst others, the emitted output which increases with increasing length. The kind of resonator oscillation also depends on the tube length. The length may be between ten centimeters and several meters.

The electric discharge in the envelope tube is maintained between two electrodes sealed within the envelope or arranged outside of the envelope. Whereas in the first case operation on direct current or alternating current is possible, the discharge with outer electrodes may be carried out with high frequency only.

Any one of several gases with low pressure, such as helium, xenon, neon, and the like, or combination thereof, may be employed as the gas filling. The most important of combinations of gases used for the purpose are a mixture of helium and xenon or helium and neon at a pressure of about one millimeter of mercury. In order to obtain optimum effect the gas filling must have a definite composition; thus a ratio of six to one is necessary with a mixture of helium and neon. The filling pressure, too, has an influence on the optimum effect of the optical laser or amplifier. Interdependency of filling pressure and gaseous mixture is very high so that the effect of the optical laser or amplifier depends decisively on its constancy.

Operation of such discharge tubes for producing forced emission hitherto showed the disadvantage of inability to maintain the pressure and the ratio of the gas mixture for a sufficiently long period. Electric absorption of the gas is the reason for this undesirable limitation. This absorption of gas under the influence of the discharge has two causes, namely, it may be brought about either by the electrodes or directly by the envelope wall. The first may be prevented by using activated incandescent electrodes or by means of outer electrodes; how the latter may be prevented has been a problem not heretofore solved, and is the subject matter of the present invention.

In case of gas absorption through the wall, not only the filling pressure is reduced, but the optimum gas composition also is altered because in the electric discharge, that component of the gaseous mixture more susceptible to being absorbed is the one which has the lower ionization potential and carries the discharge. In the case of a mixture of helium and neon, it is therefore the neon which is more susceptible to absorption. The speed of gas absorption depends very much on the material of which the discharge envelope consists, and is very high in case of glasses. Quartz glass, used primarily for other reasons advantageous for the operation, is unfortunately that material which has the highest speed of gas absorption.

According to this invention, an optical laser or amplifier is utilized haivng an elongated or tubular quartz glass envelope with means for maintaining an electric discharge communicating with the interior of the envelope which constitutes a completely sealed-in quartz glass enclosure for a selected gaseous medium within which an electric discharge is maintained, and by virtue thereof and of mirror construction at the ends of the envelope, an optical resonator is thereby formed. The feature of the invention resides in the proivsion, in conjunction with quartz glass envelope in an optical laser, of means to prevent absorption of the selected fluorescent gaseous medium or an ingredient thereof. Specifically, this objective is obtained by a protective coating applied throughout the entire interior tubular surface of the quartz glass envelope. This protective coating consists suitably of a crystallized substance. Such crystallized substances according to the invention are metal oxides or compounds of these metal oxides with oxygen acids resulting in phosphates, silivates, sulphates, etc.

Much to our surprise, it has been found that precrystallized quartz has a lower absorption speed than quartz in the form of glass. The effect is also very considerable with some oxides, particularly metal oxides as for instance $MgO$, $SnO_2$ or $ZrO_2$ alone or as derivatives therefrom formed in conjunction with appropriate oxygen acids resulting in powdery coatings, such as $MgSO_4$. The effect is not equally pronounced with all metal oxides, being for instance present but less with some, such as $Al_2O_3$ or $BeO$. Thus, according to the invention, the fused quartz envelope is coated with a layer of pulverous crystallized material which may be quartz or a metal oxide or derivative therefrom to reduce the absorption. Consequently the essence of the invention is not so much in the mode of forming, but in the provision of a coating suitably produced in such manner that it constitutes a suspension of gas-absorption-preventing substance in powdered condition with appropriate binder, for instance, a volatile organic substance, and that it is introduced into the tube on the interior wall thereof. When the suspension has flowed off and the binder and coating material has been baked by suitable envelope heating, a powdered layer remains on the wall. The baking is at a temperature sufficient to remove the binder but is not so high that there will be sintering of the powder coating particles.

Thickness of this layer or coating is not the same for all materials. It must, however, be so thick that the envelope wall is completely covered with the powder. The range of thickness of the coatings is 1 to 5 mg./cm.$^2$ depends upon and therefore determined by the specific weight of the chosen substance. It has been found that this powder layer on the interior of the envelope does not disturb the operation because radially emerging rays, being diffused on the powder layer, have no influence on the intensity of the ray longitudinally of the tube or on the degree of amplification, respectively.

The single figure of the accompanying drawing shows a laser tube embodying the invention.

In the specific embodiment of the invention illustrated in said drawing, reference numeral 1 denotes the quartz glass tube of the discharge envelope having, for example, a length of 120 cm., and an inside diameter of 8 mm. At its ends, the envelope terminates with planar parallel plates 2 of quartz set at a Brewster angle of 55° to the axis of the envelope. Reflectors 3, 3' are arranged in axial direction outside the envelope which form the optical resonator one of which is not completely coated with the reflecting mirror but has a transmissivity to rays of some percents. These mirrors may also be arranged within the envelope and may also be sealed directly to the ends of the envelope.

Reference numerals 4, 4' denote the activated incandescent electrodes. Said electrodes are sealed within electrode containers 5, 5' which are arranged vertically to the axis of the envelope 1 of the discharge tube.

The wall of envelope 1 is, according to the invention, covered on its interior with a powder crystallized coating or layer 6, which may be, for instance, the above-mentioned MgO with a thickness of 2 mg./cm.$^2$. This layer may conveniently be introduced by means of a rinsing method or otherwise if so desired.

The envelope is filled with a gaseous mixture of helium and neon in a ratio of 6:1. The filling pressure amounts to about 1 mm. Hg. The tube is operated with an operating voltage to about 2000 volts and a current density of 50–70 ma./cm.$^2$.

It has been found that the gas filling and the ratio of the gaseous mixture in this discharge tube remains constant for continuous operation of 250 hours and more, quite different from a comparison tube with quartz glass envelope without the coating or layer, the gas absorption in such comparison tubes being so great that even for so short a period of 50 hours the electric discharge could not be maintained any longer.

We claim:

1. A device for increasing constancy and life of an optical laser operating according to the principle of stimulated emission in a gaseous selectively fluorescent medium, comprising an elongated dielectric envelope in which an electric discharge is maintained within an optical resonator formed by two mirrors at opposite ends of said envelope, in which absorption of the gaseous medium during and under influence of the electric discharge is prevented by means of a protective non-reflecting coating on the inner wall of the envelope consisting of a substance from the group of $MgO$, $SnO_2$, $ZrO_2$, $Al_2O_3$, and $BeO$ in powdered condition.

2. A device as claimed in claim 1, wherein said coating comprises MgO with a thickness of at least 2 mg./cm.$^2$.

3. A device as claimed in claim 1, wherein the coating of the material selected from said group has a thickness of at least 2 mg./cm.$^2$.

References Cited

UNITED STATES PATENTS

| 3,172,057 | 3/1965 | Bennett | 331—94.5 |
| 3,394,320 | 7/1968 | Medicus | 331—94.5 |

FOREIGN PATENTS

| 608,711 | 3/1962 | Belgium. |

OTHER REFERENCES

Turner et al.: "Lifetime of Helium-Neon Lasers," Rev. Sci. Inst., vol. 35, pp. 996–1001, August 1964.

RONALD L. WIBERT, Primary Examiner

E. BAUER, Assistant Examiner

UNITED STATES PATENT OFFICE
CERTIFICATE OF CORRECTION

Patent No. 3,516,010　　　　　　　　　　　　　　June 2, 1970

Erhard Rasch et al.

It is certified that error appears in the above identified patent and that said Letters Patent are hereby corrected as shown below:

Column 3, line 38, "to" should read -- of --.

Signed and sealed this 23rd day of February 1971.

(SEAL)
Attest:

Edward M. Fletcher, Jr.
Attesting Officer

WILLIAM E. SCHUYLER, JR.
Commissioner of Patents